(12) United States Patent
Lu et al.

(10) Patent No.: US 10,136,133 B2
(45) Date of Patent: Nov. 20, 2018

(54) RATE CONTROL ADAPTATION FOR HIGH-DYNAMIC RANGE IMAGES

(71) Applicant: Dolby Laboratories Licensing Corporation, San Francisco, CA (US)

(72) Inventors: Taoran Lu, Santa Clara, CA (US); Peng Yin, Ithaca, NY (US); Tao Chen, Palo Alto, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 511 days.

(21) Appl. No.: 14/933,679

(22) Filed: Nov. 5, 2015

(65) Prior Publication Data

US 2016/0134870 A1    May 12, 2016

Related U.S. Application Data

(60) Provisional application No. 62/078,146, filed on Nov. 11, 2014.

(51) Int. Cl.
*H04N 19/146* (2014.01)
*H04N 19/124* (2014.01)
(Continued)

(52) U.S. Cl.
CPC ......... *H04N 19/124* (2014.11); *H04N 19/126* (2014.11); *H04N 19/136* (2014.11);
(Continued)

(58) Field of Classification Search
CPC .. H04N 19/124; H04N 19/136; H04N 19/126; H04N 19/147; H04N 19/186; H04N 19/172; H04N 19/65
See application file for complete search history.

(56) References Cited

U.S. PATENT DOCUMENTS

| | | | |
|---|---|---|---|
| 5,555,315 A | * | 9/1996 | Itakura ............. G01N 21/95692 348/131 |
| 6,728,317 B1 | * | 4/2004 | Demos ..................... H04N 5/14 348/E5.108 |

(Continued)

FOREIGN PATENT DOCUMENTS

| | | |
|---|---|---|
| WO | 2012/027405 | 3/2012 |
| WO | 2012/137114 | 10/2012 |

OTHER PUBLICATIONS

SMPTE Standard, "High Dynamic Range Electro-Optical Transfer Function of Mastering Reference Displays", Aug. 16, 2014.*

(Continued)

*Primary Examiner* — Sath V Perungavoor
*Assistant Examiner* — Philip Dang

(57) ABSTRACT

A high dynamic range input video signal characterized by either a gamma-based or a perceptually-quantized (PQ) source electro-optical transfer function (EOTF) is to be compressed. Given a luminance range for an image-region in the input, for a gamma-coded input signal, a rate-control adaptation method in the encoder adjusts a region-based quantization parameter (QP) so that it increases in highlight regions and decreases in dark regions, otherwise, for a PQ-coded input, the region-based QP increases in the dark areas and decreases in the highlight areas.

13 Claims, 4 Drawing Sheets

(51) Int. Cl.
*H04N 19/172* (2014.01)
*H04N 19/186* (2014.01)
*H04N 19/65* (2014.01)
*H04N 19/147* (2014.01)
*H04N 19/126* (2014.01)
*H04N 19/136* (2014.01)

(52) U.S. Cl.
CPC ......... *H04N 19/147* (2014.11); *H04N 19/172* (2014.11); *H04N 19/186* (2014.11); *H04N 19/65* (2014.11)

(56) References Cited

U.S. PATENT DOCUMENTS

| | | | | |
|---|---|---|---|---|
| 7,215,831 | B2* | 5/2007 | Altunbasak | G06T 3/40 375/240 |
| 7,889,790 | B2 | 2/2011 | Sun | |
| 7,903,733 | B2 | 3/2011 | Panda | |
| 8,019,804 | B2* | 9/2011 | Po | H04N 19/176 375/240.02 |
| 8,135,062 | B1* | 3/2012 | Cote | H04N 19/176 375/240.03 |
| 8,238,678 | B2* | 8/2012 | Cheng | H04N 19/527 382/240 |
| 8,295,626 | B2 | 10/2012 | Zhou | |
| 8,498,335 | B2 | 7/2013 | Holcomb | |
| 8,525,933 | B2* | 9/2013 | Atkins | G11B 27/034 348/642 |
| 8,654,835 | B2* | 2/2014 | Li | H04N 19/105 375/240.01 |
| 8,736,674 | B2* | 5/2014 | Hovanky | H04N 13/02 315/158 |
| 8,737,464 | B1* | 5/2014 | Zhang | H04N 19/176 375/240.03 |
| 8,780,972 | B2* | 7/2014 | He | H04N 19/176 375/240 |
| 2009/0086816 | A1* | 4/2009 | Leontaris | H04N 19/15 375/240.03 |
| 2010/0290524 | A1* | 11/2010 | Lu | H04N 19/176 375/240.03 |
| 2011/0051807 | A1 | 3/2011 | Liu | |
| 2011/0170591 | A1* | 7/2011 | Li | H04N 19/105 375/240.01 |
| 2012/0074851 | A1* | 3/2012 | Erinjippurath | G09G 3/20 315/158 |
| 2012/0201293 | A1 | 8/2012 | Guo | |
| 2012/0328004 | A1* | 12/2012 | Coban | H04N 19/105 375/240.03 |
| 2013/0022108 | A1 | 1/2013 | Panusopone | |
| 2013/0051457 | A1* | 2/2013 | Joshi | H04N 19/147 375/240.03 |
| 2013/0083845 | A1* | 4/2013 | Yu | H04N 19/197 375/240.03 |
| 2013/0101025 | A1* | 4/2013 | Van der Auwera | H04N 19/176 375/240.03 |
| 2013/0142250 | A1 | 6/2013 | Berbecel | |
| 2013/0182073 | A1* | 7/2013 | Yin | H04N 13/0048 348/43 |
| 2013/0272385 | A1* | 10/2013 | Yu | H04N 19/147 375/240.03 |
| 2013/0294524 | A1* | 11/2013 | Van der Auwera | H04N 19/176 375/240.18 |

OTHER PUBLICATIONS

ITU-T, "Series H: Audiovisual and Multimedia Systems Infrastructure of audiovisual services—Coding of moving video High efficiency video coding", Oct. 2014.*
Miller, S. et al "Perceptual Signal Coding for More Efficient Usage of Bit Codes" SMPTE Motion Imaging Journal, May-Jun. 2013, vol. 122, No. 4, pp. 52-59.
http://www.videolan.org/developers/x264.html.
Lee, Joong-Yun et al "A Rate Control Algorithm for DCT-Based Video Coding Using Simple Rate Estimation and Linear Source Model" IEEE Transactions on Circuits and Systems for Video Technology, vol. 15, No. 9, Sep. 2005, pp. 1077-1085.
Overmeire, L. et al "Constant Quality Video Coding Using Video Content Analysis" Signal Processing: Image Communication, No. 4, 2005, pp. 343-369.
Adzic, Velibor "Perceptual Methods for Video Coding" Florida Atlantic University, 2014.
ITU-R BT.1886 "Reference Electro-Optical Transfer Function for Flat Panel Displays Used in HDTV Studio Production" Mar. 2011.
SMTE ST 2084-2014 "High Dynamic Range EOTF of Mastering Reference Displays".
Stessen, J. et al "Chromaticity Based Color Signals for Wide Color Gamut and High Dynamic Range" ISO/IEC JTC1/SC29/WG11 MPEG 2014/M35065, Oct. 2014.
Naccari, M. et al "Improving HEVC Compression Efficiency by Intensity Dependant Spatial Quantisation" JCT-VC of ITU-T SG 16 WP 3 and ISO/IEC JTC 1/SC 29 WG11, 10th meeting, Stockholm, SE, Jul. 11-20, 2012, pp. 1-9.
Poynton, C. "Deploying Wide Colour Gamut and High Dynamic Range in HD and UHD" IBC 2014 Conference, Sep. 11-15, 2014, pp. 1-10.

* cited by examiner

RATE CONTROL ADAPTATION FOR HIGH-DYNAMIC RANGE IMAGES

CROSS REFERENCE TO RELATED APPLICATIONS

This application claims the benefit of priority to U.S. Provisional Patent Application Ser. No. 62/078,146, filed on Nov. 11, 2014, which is hereby incorporated herein by reference in its entirety.

TECHNOLOGY

The present invention relates generally to images. More particularly, an embodiment of the present invention relates to rate control adaptation during the compression of images with high dynamic range.

BACKGROUND

Video signals may be characterized by multiple parameters, such as bit-depth, color space, color gamut, and resolution. An important aspect of a video signal's characteristic is it dynamic range. Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is included herein by reference in its entity, defines the reference EOTF for flat panel displays based on measured characteristics of the Cathode Ray Tube (CRT). The EOTF for BT. 1886 is characterized by an exponential power function of the form:

$$L = a(\max[V+b), 0])^\gamma, \quad (1)$$

where V denotes a normalized video input signal, L denotes screen luminance in cd/m², and a, b, and gamma (γ) are variables. For example, historical video systems use a gamma of 2.4. As used herein, the term "gamma-coded signal" may denote a video signal coded using a traditional gamma-based EOTF, such as BT. 1886. Most signals of standard dynamic range (SDR) are indeed gamma-coded signals.

Most commercially available professional monitors are characterized by relatively low dynamic range (e.g., 100 to 500 nits); however, newer professional monitors, such as those demonstrated by Dolby Laboratories, may allow for displaying signals at much higher dynamic rates (e.g., 1,000 nits to 5,000 nits, or more). Such displays may be defined using alternative EOTFs that support high luminance capability (e.g., 0 to 10,000 nits). EOTFs are traditionally optimized according to the characteristics of the human visual system (HVS). Signals are coded and quantized based on how many "just noticeable difference" (JND) steps are perceived by human vision. While a gamma-based function imposes a fair degree of perceptual uniformity for SDR signals, HDR signals require perceptual uniformity over a much wider range. An example of such an EOTF is defined in SMPTE ST 2084:2014 "High Dynamic Range EOTF of Mastering Reference Displays," which is incorporated herein by reference in its entirety. Another example of a perceptually-quantized EOTF is presented in "Chromaticity based color signals for wide color gamut and high dynamic range," by J. Stessen et al., ISO/IEC JTC1/SC29/WG11 MPEG2014/M35065, October 2014, which is incorporated herein by reference in its entirety. As used herein, the term "PQ-coded signal" may denote a video signal coded with a perceptual quantization function, such as the ones described in SMPTE ST 2084 and the M35065 submission. Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model. The inverse of the EOTF, (commonly referred to as OETF or $EOTF^{-1}$) is typically applied to the signal by the transmitter. Given a video stream, information about its EOTF or OETF is typically embedded in the bit stream as metadata and there is a direct correspondence between an EOTF and its inverse; thus, given an EOTF, one can determine its OETF, and vice versa.

In recent years, there has been an increased interest in compressing video signals. Examples of video compression methods include both standards-based techniques (such as MPEG-2, MPEG-4, H.264, H.265, and the like) and proprietary techniques (such as Windows Media Video from Microsoft, and VP8 and VP9 from Google). Most of these compression techniques target the efficient coding of gamma-coded SDR signals (typically, up to a bit depth of 10 bits). As appreciated by the inventors here, with the proliferation high-dynamic range images, improved compression techniques for PQ-coded images are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Given perceptually quantized images or video signals, rate-control adaptation techniques are described herein for image and video data compression.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to rate-control adaptation techniques for the compression of high-dynamic range images and video signals. Given an input high-dynamic range image, an encoder determines its EOTF mode and luminance ranges according to one or more thresholds. For an image region in the image, the encoder computes a metric of luminance (such as the mean) for pixels in the image region and determines a quantization parameter delta ($QP_{delta}$) for the image region based on the metric of luminance and its EOTF mode. Given a base quantization parameter ($QP_{Base}$), the encoder determines a new quantization parameter ($QP_{new}$) based on the quantization parameter delta and the base quantization parameter, where for gamma-coded signals, the new quantization parameter increases in highlight luminance regions and decreases in dark luminance regions, otherwise, the new quantization parameter decreases in highlight luminance regions and increases in dark luminance regions.

Rate Control Adaptation as a Function of the Signal EOTF

Figure 1:
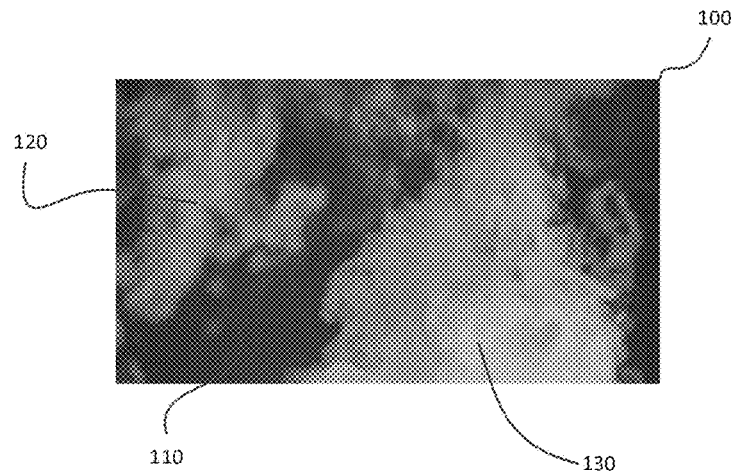
FIG. 1 depicts an image with example darks, mid-tones, and highlights regions.

With reference to an example image (100) depicted in FIG. 1, in terms of brightness (or luminosity), most images are characterized by three luminosity ranges: darks (e.g., 110), mid-tones (e.g., 120), and highlights (e.g., 130). Looking into a small area in an image, gamma-coded images typically exhibit very little variance in the dark areas because gamma coding tends to allocate more codewords in the bright areas (highlights) of an image. In contrast, perceptual quantization (PQ), tends to allocate more codewords in the darks of the image, hence PQ-coded images typically exhibit small block-variances in the highlights. Most commercially available video encoders (e.g., H.264, H.265, VP8, and the like) are typically tested and optimized for gamma-coded test signals. Hence, when the input comprises PQ-coded signals, the modeling mismatch may lead to sub-optimal compression and bad visual quality.

In transform-based coding of images and video signals, an image or a frame is divided into coded regions (e.g., macroblocks or coding units). A representation of the pixels in each region (e.g., a block of the original pixels or a block of residual values) is then transformed from the spatial domain into a frequency domain. In lossy compression, the transformed coefficients are scaled (or quantized) by a quantization value and then entropy-encoded to form the compressed bit stream. The higher the quantization, the better the compression, at the expense of image quality. Quantization is typically controlled by a quantization parameter (QP) value which is also communicated by the encoder to the decoder as part of the coded bitstream. QP values are mapped to quantization scaling values via look-up tables or a pre-determined mapping function. Quantization parameters typically can be adjusted at the picture, slice, or region level via QP adjustments or QP deltas. In most coding standards, the way QP is adjusted is beyond the scope of the standard specification, as long as the transmitted QP values are within a legal range and are transmitted according to the syntax and specification of the standard.

Figure 2A:
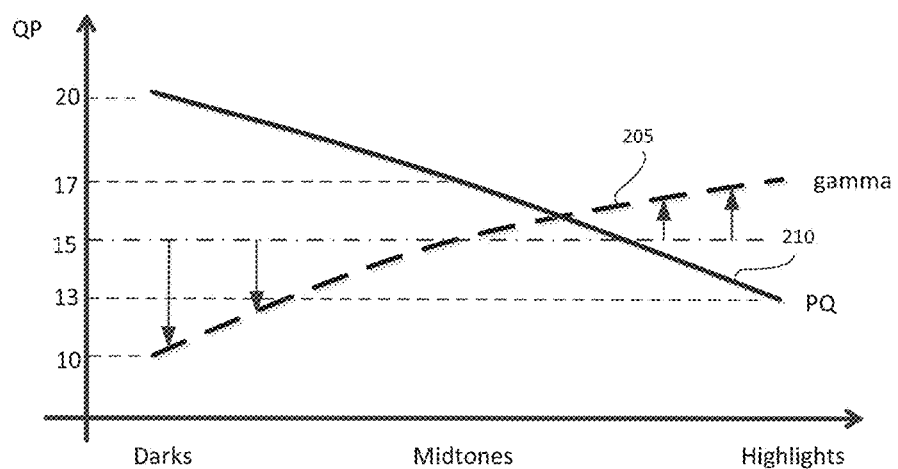
FIG. 2A depicts effects of quantization parameters (QP) on an image coded using either a gamma-based EOTF or a PQ-based EOTF and a rate-control adaptation scheme for gamma-coded images.

Consider now the image (100) of FIG. 1 coded using both gamma coding and PQ coding. FIG. 2A depicts the results of an experiment to determine how adjusting a video coder's quantization parameter (QP) effects image quality depending on the EOTF of the image. For simplicity, a single QP value was used to encode the whole image. QP was varied between 0 and 51. After compression and decompression, for each QP value, a subjective determination was made whether the dark, mid-tones, and highlights regions of the image were considered perceptually lossless or not. FIG. 2A depicts the QP values for which one starts seeing image artifacts in the three regions of the image. For example, for the gamma-coded image (205), for blacks, distortion starts at QP=10, for mid-tones, distortion starts at QP=15, and for the highlights, distortion starts at QP=17. For the PQ-coded image (210), for blacks, distortion starts at QP=20, for mid-tones, distortion starts at QP=17, and for the highlights, distortion starts at QP=13.

From FIG. 2A, a PQ-coded image is much more tolerant to large QP values in the darks than in the highlights. One notes also that neither the gamma-coded nor the PQ-coded signals have an "ideal" QP curve which is flat across all luminance values. For example, for the PQ-coded image (210), the highest QP for which the compressed image may be considered subjectively lossless is QP=13. QP values higher than 13 will affect the perceptual quality of the highlights. Similarly, for the gamma-coded image (205), the highest QP for which is the compressed image may be considered subjectively lossless is QP=10. QP values higher than 10 will affect the perceptual quality of the blacks. If any of these curves were flat across all luminance ranges, say at QP=16, then one could achieve higher compression without any perceptual loss.

Consider now compressing a gamma-coded video signal using a standards-based codec, such as the x264 codec provided by the VideoLAN organization, which may adjust QP values according to the variance of the pixels on a block under consideration. In most codecs, for small block variances (typically corresponding to dark areas) the QP decreases, but for large block variances (typically corresponding to bright areas) the QP increases. This approach effectively reflects the behavior of the gamma-coded image (205) depicted in FIG. 2A, by adaptively compensating for the non-horizontal QP curve (205). For example, assume that at the frame-level QP=15. Then, for darker areas QP should be decreased and for highlights QP should be increased. This allows for a more efficient bit allocation and better overall video quality. However, applying the same rule to a PQ-coded signal will fail, since as depicted in FIG. 2A, PQ-coded signals behave differently than gamma-coded signals.

Figure 2B:
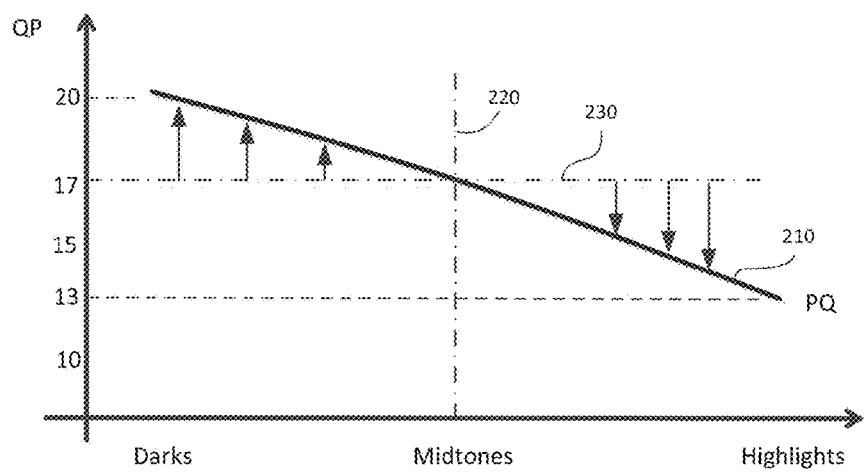
FIG. 2B depicts a rate-control adaptation scheme for a PQ-coded image according to an embodiment of the present invention.

As depicted in FIG. 2B, a different rate-control adaptation is proposed for PQ-coded signals. In an example embodiment, given a mid-tones threshold (220) and a base QP value (230), QP is increased for darks (or for pixel values with luminance below the mid-tones) and QP is decreased for highlights (or pixel values with luminance above the mid-tones).

Figure 3A:
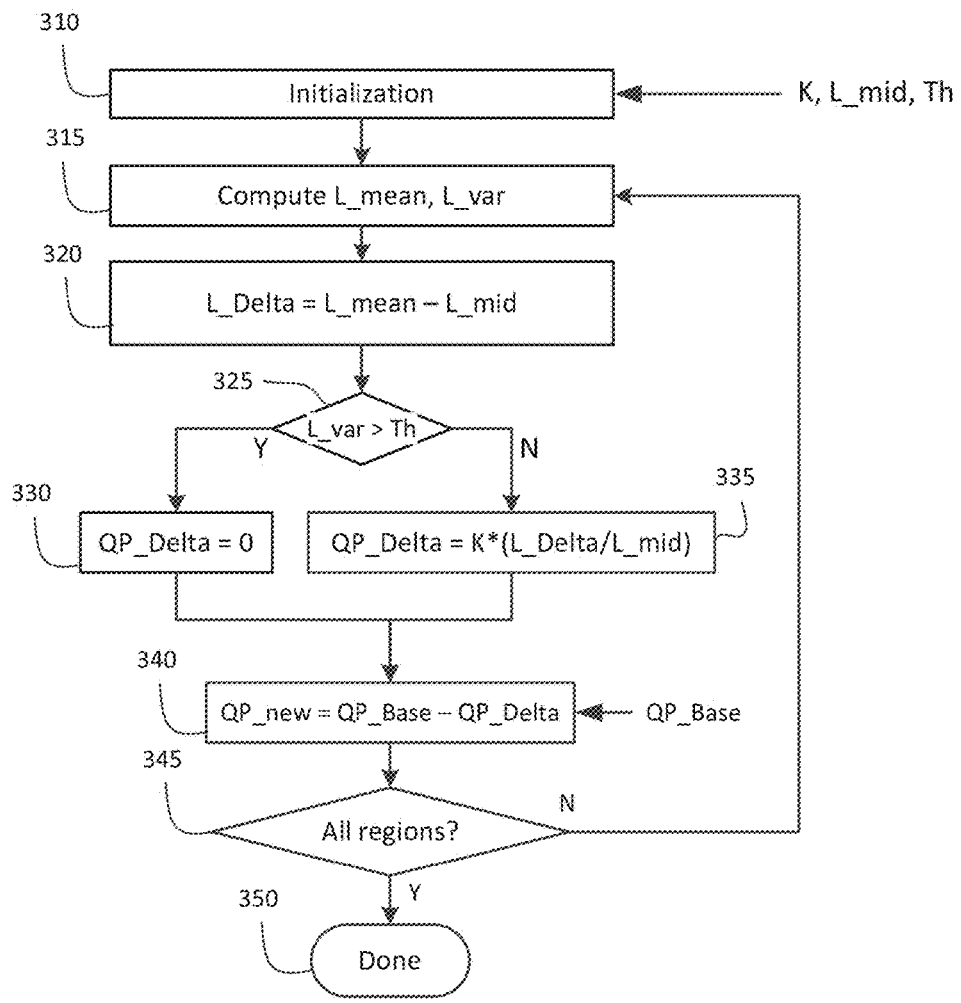
FIG. 3A and FIG. 3B depict examples of rate-control adaptation schemes for gamma-coded and PQ-coded images according to embodiments of the present invention.

FIG. 3A depicts in more detail an example of a rate-control adaptation process for PQ-coded or gamma-coded images according to an embodiment. In step (310), various system-level parameters may be initialized. For example, $L_{mid}$ may denote a mid-tone luminance threshold value to distinguish between darks and highlights. For example, in an embodiment, $$L_{mid} = 2^{(bitdepth-1)}, \quad (2)$$

where bitdepth denotes the bit depth of the luminance. For example, one may define $L_{mid}=512$ for 10-bit images. For 8-bit images, experiments have indicated that $L_{mid}=170$ yields good results as well; however, alternative mid-tone threshold values may be selected according to the characteristics of the input signals. The mid-tone threshold $L_{mid}$ may also be constantly adapted, e.g., at the scene, frame, or slice level.

In an embodiment, without limitation, for each image block or region, QP may be adapted based on a metric of luminance (such as the mean ($L_{mean}$), median, maximum, variance ($L_{var}$), and the like) of the pixels in the block or region. This luminance metric and other region-based parameters may be computed in step (315). In an embodiment, according to steps (325) and (330), it may be desirable to not adjust QP for certain blocks, e.g., for blocks for which $L_{var}>Th$, where Th is a predetermined threshold. As will be discussed in more detail later on, one may take into account additional parameters (such as texture of the block or bit rate limits) to adjust the QP for such blocks. In an embodiment, the simple test of whether $L_{var}>Th$ may be used to classify a block as a block of high detail (or texture), for which the rate control unit of the encoder may apply even more aggressive quantization. In some embodiments, steps (325) and (330) may be skipped.

Assuming, without limitation, a linear adaptation model, in step (335), in an embodiment, a $QP_{Delta}$ may be computed as:

$$QP_{Delta} = \text{round}\left(K \frac{L_{mean} - L_{mid}}{L_{mid}}\right), \quad (3)$$

where K denotes the rate of adaptation and the round function is rounding $QP_{Delta}$ to the integer closer to 0.

In an embodiment, K may be a function of the slope of the QP-versus-luma curve (210). For example, in an embodiment, K comprises the difference between the highest allowable QP for perceptually lossless darks (e.g, QP=20) and the highest QP for perceptually lossless highlights (e.g., QP=13), e.g., for the data depicted in FIG. 2B, K=20−13=7. Note that under this definition K may be positive for PQ-coded signals and negative for gamma-coded signals, hence the same process may be applied to both gamma-coded and PQ-coded signals.

In another embodiment, instead of computing $QP_{Delta}$ according to equation (3), alternative linear and non-linear adaptation models could be used, such as piece-wise linear, quadratic, or higher-order polynomial models. Some embodiments may also use two or more luminance thresholds (220).

Let $QP_{Base}$ (230) denote the fixed QP allocated for a slice or the whole image for the block under consideration, then, in step (340), a new QP value may be computed as:

$$QP_{new} = QP_{Base} - QP_{Delta}. \quad (4)$$

Based on equations (3) and (4), for a perceptually-coded video signal, $QP_{new}$ will be smaller than $QP_{Base}$ when the luminance metric (e.g., $L_{mean}$) is higher than the mid-tones threshold, and $QP_{new}$ will be larger than $QP_{Base}$ when the luminance metric is smaller than the mid-tones threshold. For a conventional gamma-coded video signal, $QP_{new}$ will be larger than $QP_{Base}$ when the luminance metric (e.g., $L_{mean}$) is higher than the mid-tones threshold, and $QP_{new}$ will be smaller than $QP_{Base}$ when the luminance metric is smaller than the mid-tones threshold. Steps (315) to (340) may be repeated for all regions in a frame or image of interest.

Figure 3B:
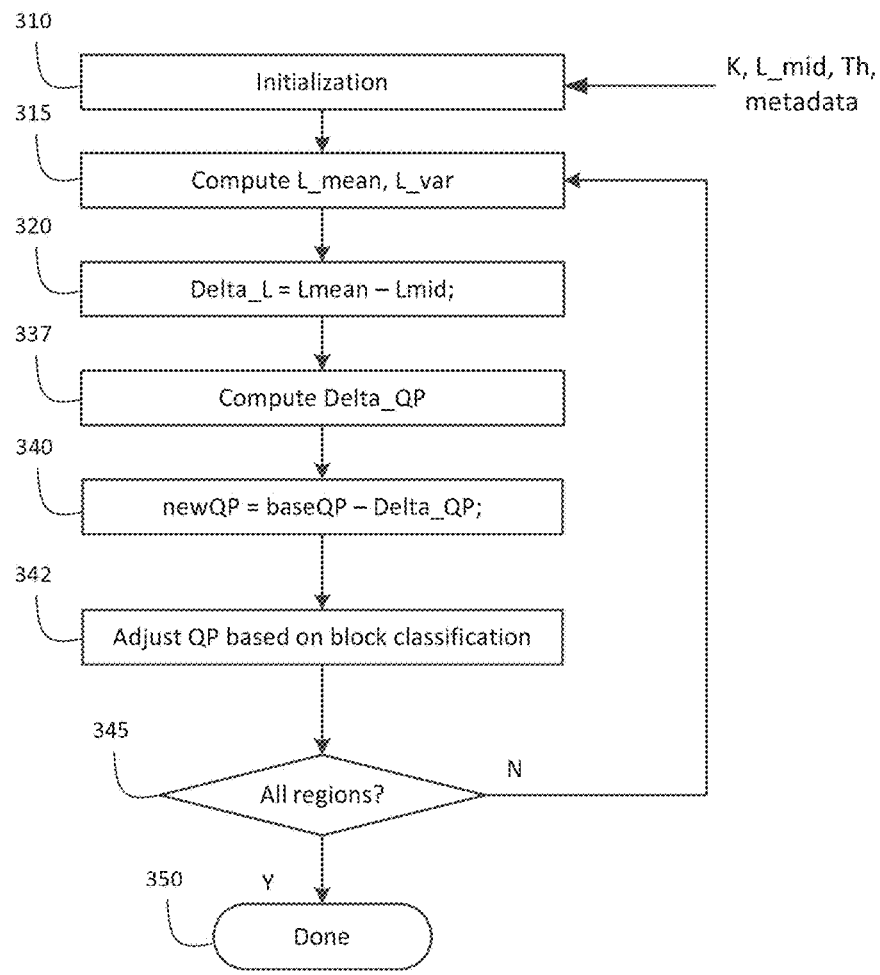

In some embodiments, as depicted in the example rate-control adaptation process of FIG. 3B, after a luminance-based rate control adaptation, it may be desirable to further adjust the QP based on block classification. For example, in an embodiment, the source content may be analyzed on a per block basis and each block may be assigned into a class from a set of block classes. For example, in terms of complexity or image details, from low to high, a block may be characterized as a DC Block (small variations), a vertical edge, a horizontal edge, a 135-degree diagonal edge, a 45-degrees diagonal edge, a regular texture, or a complex texture. Such classification may be computed by the image or video encoder itself, or it could be passed to the encoder using metadata.

As depicted in FIG. 3B, after the QP adaptation based on luminance (e.g., steps 315-340), in step (342), additional adaptation may occur based on the block classification. For example, in an embodiment, in step (342), QP may be further reduced for blocks classified as DC blocks or edge blocks, but may be increased for blocks classified as complex-texture blocks. Such adjustments make take into consideration other input parameters as well, such as region of interest (ROI) classifications and/or rate control constrains.

Figure 4:
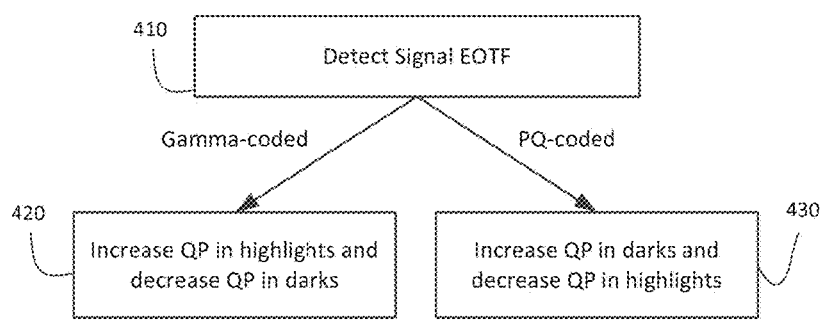
FIG. 4 depicts a rate control adaptation scheme according to an embodiment of the present invention.

FIG. 4 depicts an example of a rate adaptation technique based on an embodiment. The technique allows a video codec to adapt its quantization scheme according to the EOTF of the input signal. As depicted in FIG. 4, in step (410), an attempt is made to determine the signal's EOTF encoding. The EOTF may be determined using signal metadata, local computations, or other means (e.g., a user input). Then, given a baseline quantization value, for gamma-coded signals (420), the encoder may adjust the quantization parameter to increase in the highlights, but decrease in the darks. For PQ-coded signals (430), the encoder may decide to increase the quantization parameter for the darks and decrease it for the highlights.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating rate-control adaptation, such as those described herein. The computer and/or IC may compute any of a variety of parameters or values that relate to relating rate-control adaptation processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to relating rate-control adaptation as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES, AND MISCELLANEOUS

Example embodiments that relate to relating rate-control adaptation are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for rate-control adaptation in an image encoder, the method comprising:
    accessing by the encoder an input image to be compressed, the image comprising one or more image regions;
    determining by the encoder a threshold for the image;
    for an image region in the image, using the encoder:
    computing a metric of luminance for pixels in the image region, wherein the metric of luminance comprises the mean, median or maximum luminance value of the image region;
    determining a quantization parameter delta ($QP_{Delta}$) for the image region based on the metric of luminance; and
    adjusting a base quantization parameter ($QP_{Base}$) based on the quantization parameter delta and the threshold to generate a new quantization parameter ($QP_{new}$), wherein the new quantization parameter is smaller than the base quantization parameter if the metric of luminance is higher than the threshold, and the new quantization parameter is larger than the base quantization parameter if the metric of luminance is lower than the threshold wherein the quantization parameter delta is computed according to a linear model $$QP_{Delta} = \text{round}\left(K \frac{L_{mean} - L_{mid}}{L_{mid}}\right)$$

where K is a constant, $L_{mean}$ denotes the metric of luminance, $L_{mid}$ denotes the threshold, and round denotes a rounding to an integer function.

2. The method of claim 1, wherein the input image is a high-dynamic range image.

3. The method of claim 1, wherein the input image is encoded by a perceptually-quantized electro-optical transfer function (EOTF) which allocates more codewords to black-levels than to highlights.

4. The method of claim 3, wherein the EOTF is determined according to the SMPTE ST 2084:2014 specification.

5. The method of claim 1, wherein the metric of luminance comprises the mean luminance value of the pixel region.

6. The method of claim 1, wherein the metric of luminance comprises the median or maximum luminance value of the pixel region.

7. The method of claim 1, further comprising adjusting the new quantization parameter according to texture information about the image region.

8. The method of claim 7, wherein the texture information about the image region is determined from received metadata.

9. The method of claim 1 wherein the quantization parameter delta value is set to zero if a second metric of luminance of the image region is larger than a second threshold.

10. The method of claim 9, wherein the second metric of luminance comprises the variance of luminance in the image region.

11. The method of claim 1, wherein the threshold is a mid-tones threshold.

12. An apparatus for rate-control adaptation in an image encoder, the apparatus comprising:
    an input for accessing by the encoder an input image to be compressed, the image comprising one or more image regions;
    a processor for determining by the encoder a threshold for the image;
    a processor, wherein for an image region in the image the processor:

computes a metric of luminance for pixels in the image region, wherein the metric of luminance comprises the mean, median or maximum luminance value of the image region;

determines a quantization parameter delta ($QP_{Delta}$) for the image region based on the metric of luminance; and adjusts a base quantization parameter ($QP_{Base}$) based on the quantization parameter delta to generate a new quantization parameter ($QP_{new}$), wherein the new quantization parameter is smaller than the base quantization parameter if the metric of luminance is higher than the threshold, and the new quantization parameter is larger than the base quantization parameter if the metric of luminance is lower than the threshold, wherein the metric of luminance comprises the mean, median or maximum luminance value of the pixel region, and wherein computing the quantization parameter delta comprises computing:

$$QP_{Delta} = \text{round}\left(K \frac{L_{mean} - L_{mid}}{L_{mid}}\right)$$

where K is a constant, $L_{mean}$ denotes the metric of luminance, $L_{mid}$ denotes the threshold, and round denotes a rounding to an integer function.

13. A non-transitory computer-readable storage medium having stored thereon computer-executable instructions for executing a method with a processor in accordance with claim 1.

* * * * *